(12) United States Patent
Ehrmann

(10) Patent No.: US 7,726,097 B2
(45) Date of Patent: Jun. 1, 2010

(54) PACKAGING MACHINE SUPPORT DEVICE

(75) Inventor: Elmar Ehrmann, Bad Groenenbach (DE)

(73) Assignee: Multivac Sepp Haggenmuller GmbH & Co. KG (DE)

( * ) Notice: Subject to any disclaimer, the term of this patent is extended or adjusted under 35 U.S.C. 154(b) by 30 days.

(21) Appl. No.: 11/882,940

(22) Filed: Aug. 7, 2007

(65) Prior Publication Data
US 2008/0034710 A1 Feb. 14, 2008

(30) Foreign Application Priority Data
Aug. 8, 2006 (DE) .................. 10 2006 037 295

(51) Int. Cl.
*B65B 65/00* (2006.01)
*B65B 59/04* (2006.01)

(52) U.S. Cl. .................. 53/393; 52/846; 198/860.1; 198/860.2; 248/676

(58) Field of Classification Search .................. 53/559, 53/561, 393; 52/846; 198/860.1, 860.2; 248/676; *B65B 65/00, 59/04, 9/04, 41/00, B65B 59/00*
See application file for complete search history.

(56) References Cited

U.S. PATENT DOCUMENTS

| 2,712,717 | A | * | 7/1955 | Keller .................. 53/559 |
| 3,126,681 | A | * | 3/1964 | Cloud .................. 53/559 |
| 3,890,755 | A | * | 6/1975 | Specht .................. 52/645 |
| 4,048,782 | A | * | 9/1977 | Hamilton .................. 53/559 |
| 4,056,180 | A | * | 11/1977 | Gunti .................. 198/860.3 |
| 4,124,113 | A | * | 11/1978 | Trees .................. 198/461.1 |
| 4,300,016 | A | * | 11/1981 | Bergeron et al. .................. 174/373 |
| 4,366,663 | A | * | 1/1983 | Grebe .................. 53/559 |
| 4,399,908 | A | * | 8/1983 | Gunti .................. 198/860.2 |
| 4,556,143 | A | * | 12/1985 | Johnson .................. 198/860.1 |
| 5,426,919 | A | * | 6/1995 | Natterer et al. .................. 53/559 |
| 5,682,729 | A | * | 11/1997 | Buchko .................. 53/559 |
| 6,453,650 | B1 | * | 9/2002 | Laguna .................. 53/559 |
| 2002/0023417 | A1 | * | 2/2002 | Becker .................. 53/559 |
| 2002/0152718 | A1 | * | 10/2002 | Schubert .................. 53/393 |
| 2005/0247020 | A1 | * | 11/2005 | Niesar et al. .................. 52/750 |
| 2008/0163761 | A1 | * | 7/2008 | Champalaune et al. .................. 99/426 |

FOREIGN PATENT DOCUMENTS

| DE | 3143378 A1 | * | 12/1982 |
| DE | 102 14 344 A1 | | 10/2003 |
| DE | 103 59 478 A1 | | 7/2005 |
| EP | 92402 A2 | * | 10/1983 |
| EP | 0 569 935 B1 | | 12/1995 |
| FR | 2494334 A1 | * | 5/1982 |
| JP | 59167405 A | * | 9/1984 |

\* cited by examiner

*Primary Examiner*—Stephen F Gerrity
(74) *Attorney, Agent, or Firm*—Brooks Kushman P.C.

(57) ABSTRACT

The invention provides a packaging machine support device having a frame with side walls and feet which bear the latter, and having at least one workstation borne by this frame, the side walls being in profile form. The packaging machine support device in accordance with the invention is suited to comply with the increasingly stringent hygiene requirements for packaging machines. This is achieved according to the invention by providing a frame profile (7) that is essentially open at the sides.

20 Claims, 3 Drawing Sheets

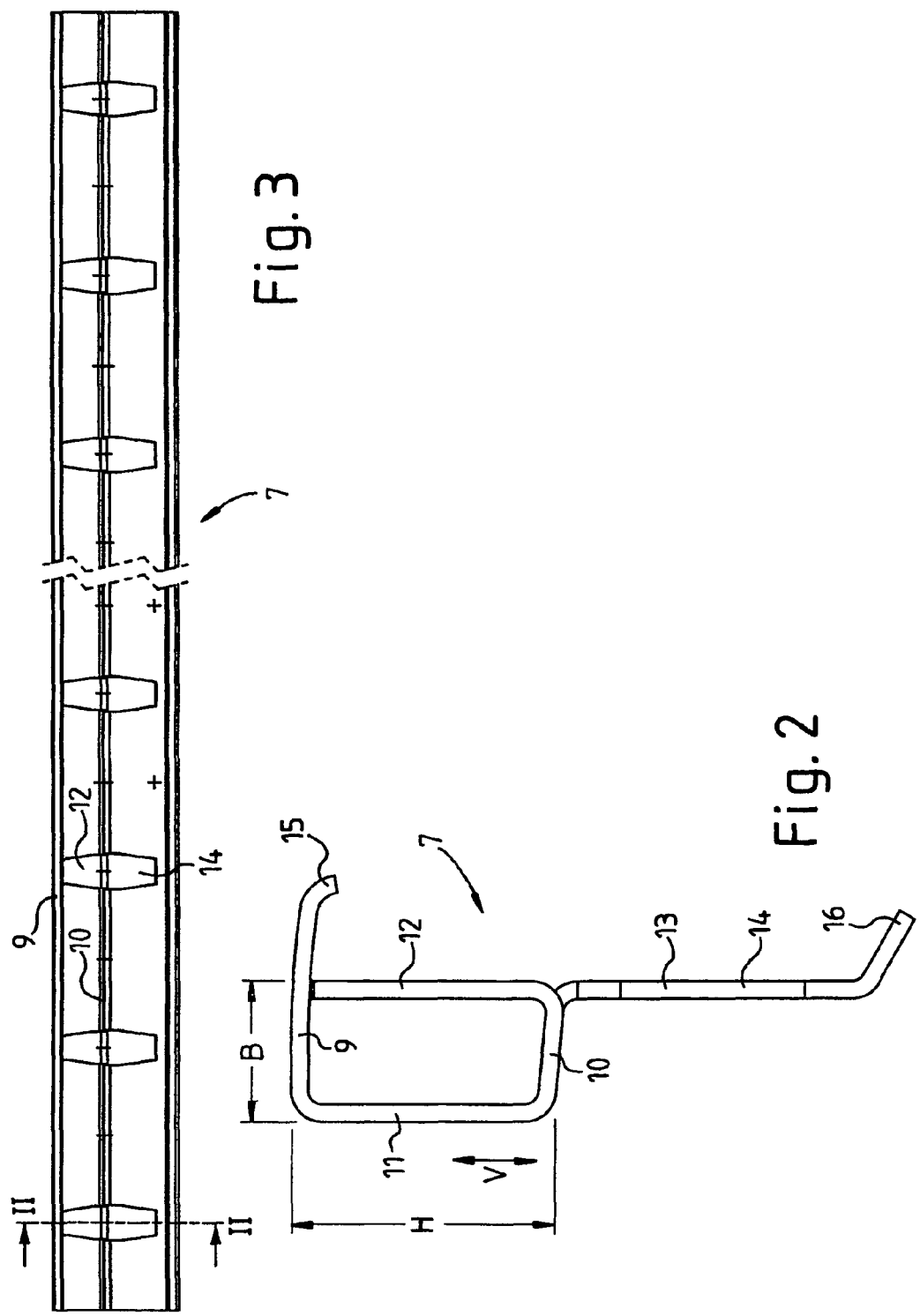

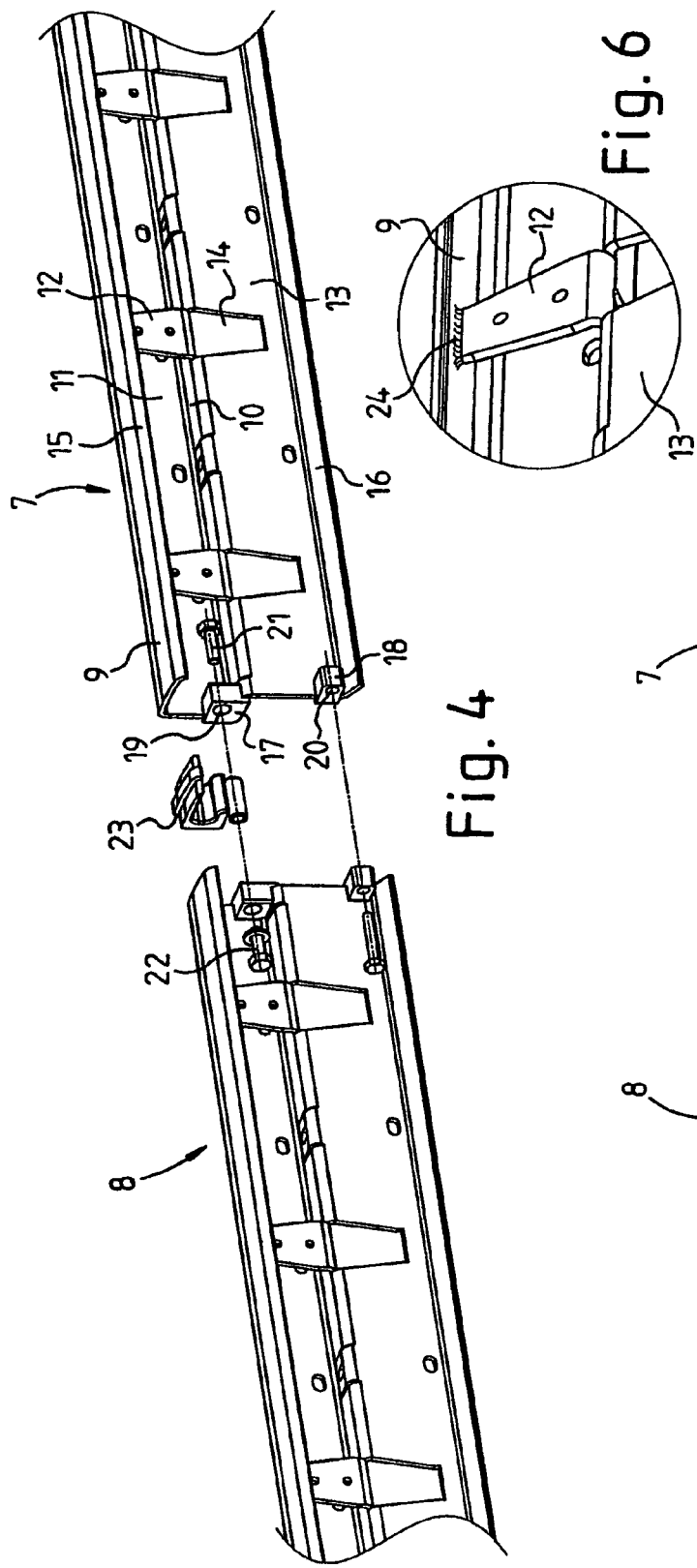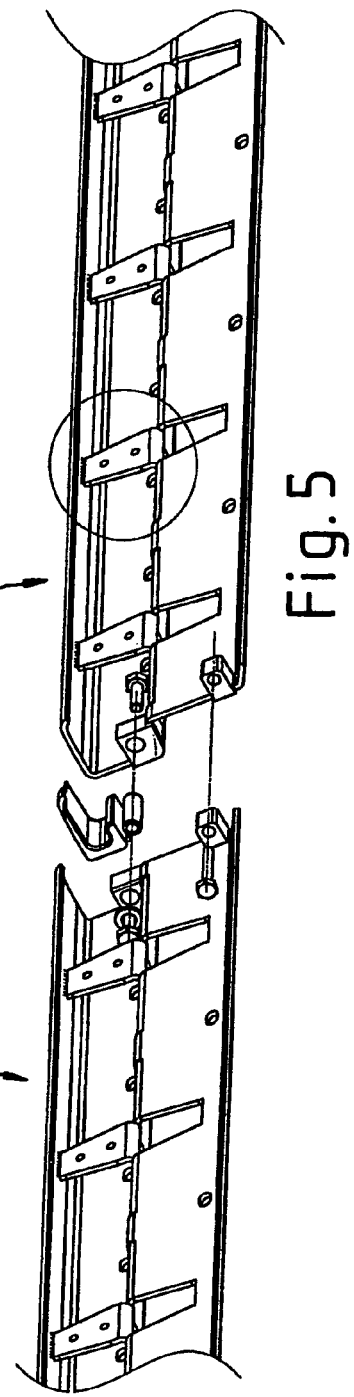

US 7,726,097 B2

PACKAGING MACHINE SUPPORT DEVICE

BACKGROUND OF THE INVENTION (1) Field of the Invention

The invention relates to a packaging machine support device having a frame, side walls and feet for bearing the frame and having at least one workstation borne by the packaging machine support device. More particularly the invention pertains to a packaging machine support device having an open profile with stiffening lugs disposed along the open profile to partially close a side of the open profile at predetermined locations.

(2) Description of Related Art Including Information Disclosed Under 37 CFR 1.97 and 1.98

Such a packaging machine is described, for example, in EP 0 569 935 B1. The profile described in the latter document for the purpose of forming the frame is designed with an essentially U-shaped cross section which is open in the downward direction. This profile is closed, i.e. not internally visible, in the direction of the outside of the packaging machine. Spaced-apart connecting elements are fixed to the ends of the U profile at regular intervals from the underside.

Packaging machines of the type mentioned have to meet increasingly stringent hygiene requirements.

The frame profile of the packaging machine according to the prior art is difficult to access from beneath for cleaning purposes. It is likewise the case that a visual inspection of the cleaning result can only be carried out with extreme difficulty, if at all.

BRIEF SUMMARY OF THE INVENTION

The object of the invention is thus to provide a packaging machine which complies with the increasing hygiene requirements for packaging machines. These requirements are achieved by having a frame having side walls with an open profile that is only partially closed by stiffening lugs disposed at various locations along the length of the frame, by having the open profile on the outside of the frame, by having the stiffening lug with a height (H) greater than the width (B), by having a longitudinal web on the open profile of the frame run in a longitudinal direction, by forming the open profile of the frame integrally with the longitudinal web, by having the longitudinal web formed on the underside of the open profile, by having the stiffening lugs separated out of the longitudinal web, by having the stiffening lugs bent at one end and fastened on the open profile at the opposite free end, by welding the bent end of the stiffening lugs to the open profile, by through-welding weld seams, by having the longitudinal web wider than the open profile, by having unit-spaced connecting elements for connecting segments of the open profile frame, by providing holes in the vertical leg and/or stiffening lugs and/or in the longitudinal web as connecting elements, by having the end-side connecting elements for end-side connection of two open profiles, having an insert part as a connecting element for the end-side connection of two open profiles, having the connecting elements in an open profile spaced apart from the nearest stiffening lug, by having an open profile with at least one downwardly sloping run off slope running in the direction of the outside of the frame and by producing a frame with an open profile with stiffening lugs by continuously punching, rolling and/or welding in a profiling installation.

Starting with a packaging machine having a frame, side walls and feet and having at least one workstation as a departure point, this object is achieved by the defining features of the frame and side walls.

Accordingly, a packaging machine according to the invention is distinguished in that the profile of the frame is essentially open, and only partially closed, at the sides.

The profile according to the invention, rather than being a U profile which is open in the downward direction, is thus open, and accessible, from the side. Such a profile may be configured, at least in certain regions, as a C profile.

The laterally open configuration of the profile renders the latter more easily accessible for cleaning purposes and readily internally visible, in particular, for the purposes of a visual inspection.

The profile is preferably partially closed by stiffening lugs, this improving the rigidity of the profile and thus the mechanical loading capability thereof.

In a special embodiment of the invention, the profile is open on the outside of the frame. This means that the interior of the profile is easy to clean, and readily visible, from the outside. Furthermore, on the inside, which is directed towards the transporting unit for the packaging film and on which the products which are to be packaged are located during operation, the profile forms a smooth and thus likewise easy-to-clean inner wall.

The height of the profile is preferably greater than the width. On the one hand, such a configuration is considerably more rigid and can thus absorb greater loads. On the other hand, such a profile, in combination with the laterally opening accessibility, is particularly easy to clean since the lateral opening of the profile extends over a greater height and thus the accessibility as well as the internal visibility are further improved.

A longitudinal web running in the longitudinal direction is advantageously provided in addition. Such a longitudinal web can additionally stiffen the profile according to the invention and, furthermore, also perform further functions, as described hereinbelow.

In a special embodiment, the profile is formed integrally with the longitudinal web. It may be produced, for example, from a metal sheet, e.g. a stainless-steel sheet, but also from an aluminium sheet or the like. Such production is possible, for example, using a so-called profiling installation, which can produce such a single-piece profile continuously.

The longitudinal web is preferably formed on the underside of the profile. This means that there are no troublesome edges located on the top side of the profile. The top side of the profile may be closed off in planar manner by a horizontal leg of the profile, just as the inside is closed off by a vertical leg which adjoins the top horizontal leg.

In a preferred embodiment, the longitudinal web is provided with cutouts, as a result of which reduces the weight of the profile without significantly impairing the stiffening function.

In a particularly advantageous embodiment of the invention, the stiffening lugs are produced by being separated out of the profile, in which case there is no need to provide any additional material for producing the stiffening lugs.

Production of the stiffening lugs is particularly advantageous if, rather than being detached on one side, they are simply bent from the profile and fastened thereon again at the opposite, free end. As a result, the profile is stiffened to a considerable extent in the region of the stiffening lugs with extremely low material and production outlay.

In a special embodiment of the invention, the profile is provided with an angled portion or bent portion all the way along the top side, in which case a continuous top horizontal leg is formed. In conjunction with stiffening lugs as referred to above, which can be fastened in their end position on the top horizontal leg of the profile, a box-profile shape is obtained in the region of the stiffening lugs, and this increases rigidity to a considerable extent.

The stiffening lugs are advantageously fastened at the free end by welding, for which good stability and heat resistance of the connection is established. This also makes it possible for the profile to be readily cleaned and disinfected using hot media such as superheated steam, the connecting lugs being through-welded at their free end in a preferred embodiment, in which case the region of this closed weld seam no longer contains any gap in which dirt or germs could possibly be deposited.

In particular if use is made of stainless steel, the free end of the connecting lugs is preferably laser-welded. This method results in a weld seam which is fully through-welded, even depthwise, with the advantages referred to above.

It is also possible, however, to use other welding methods, for example shielded arc welding or the like, to produce such a profile. Shielded arc welding, for example, avoids pronounced tarnishing, which is likewise advantageous.

If the profile is formed such that the longitudinal web is higher than a vertical profile leg, then a lug which is cut out of the longitudinal leg can span a height in the profile which is equal to or greater than the vertical web. In such an embodiment it is generally appropriate, to provide sufficient material for forming structures in the stiffening lugs. It always is advantageous for sufficiently long stiffening lugs to be detached from, for example cut or punched out of, a longitudinal web of the abovementioned height, in order then to attain the desired connecting location in the profile by bending.

Fastening means for further machine parts are provided, preferably at unit spacings, on a frame profile according to the invention. Such fastening means may be formed, for example, by holes which are provided at unit spacings in the vertical leg and/or in the longitudinal web, in which case corresponding machine parts can easily be fastened by means of screw connection. Furthermore, it is also advantageous for fastening means, for example once again in the form of bores, to be provided in the stiffening lugs. This provides for machine parts which are fastened on the inside of the profile to be supported on the connecting lug in addition.

In order to provide for the connection of two profiles according to the invention to one another at the end sides, end-side connecting elements are advantageously provided. Such connecting elements may be end-side screw-connection plates which extend, for example, transversely to the profile and are connected, for example welded, to the frame profile at the desired position. Here too, it is recommended once again for the weld connection to be through-welded, in order to ensure the abovementioned ease of cleaning.

In an advantageous embodiment of the invention, furthermore, at least one insert part is provided as a connecting element between the profiles which are to be connected to one another. Such a connecting component can be used not just for connecting the profiles, but also as a spacer, in order for a defined gap to be left open between the profiles which are to be connected. This gap here may be of sufficiently large dimensions to allow it to be readily accessible for cleaning, for example with a high-pressure cleaner or a steam cleaner, and, furthermore, to be internally visible, in the same way as the profile. Cleaning by mechanical cleaning implements is also provided for in the case of the correspondingly dimensioned gap.

Furthermore, the profile advantageously has at least one downwardly sloping surface, running away from the packaging-transporting unit, i.e., in the embodiment referred to above, running away from the inside of the profile, as a run-off slope. Such a configuration ensures that any cleaning liquid or the like which runs off is directed away from the transporting unit in the inner region of the machine.

As already indicated above, a profile according to the invention is advantageously produced continuously in a profiling installation. Such production can be carried out here by punching, rolling and welding. It is thus advantageous, once the stiffening lugs have been initially punched out, for the stiffening lugs and the top horizontal leg to be bent over by rolling. Following subsequent welding, the profile can be rolled again in the same pass, if required in the same installation, in order for a desired shape to be produced.

The profile according to the invention is advantageously used in so-called web-fed or thermoforming machines, but also in so-called tray sealers. In such machines, articles to be packed, often comprising foodstuffs, are positioned in preformed packaging and sealed. In the case of the thermoforming or web-fed machine, the packaging is produced continuously from a packaging film by thermoforming, directly in the machine, prior to the articles being packed, and is cut following the sealing operation.

The workstations of such a machine are, for example, a forming station, a sealing station, a cutting station, etc.

The film here, in known machines, is retained in a transporting arrangement and transported in the longitudinal direction of the machine, e.g. by a pair of endless chains. The chain guides and the deflecting rollers are fastened on frame profiles according to the invention. It is also the case that the abovementioned workstations are fastened wholly or partially on a web profile according to the invention. This makes it necessary for the profiles to be of stable configuration.

BRIEF DESCRIPTION OF THE SEVERAL VIEWS OF THE DRAWINGS

An exemplary embodiment of the invention is illustrated in the drawing and will be explained in more detail hereinbelow with reference to the figures, in which, specifically:

FIG. 2 shows an end view of a profile taken along the line II-II of FIG. 3 according to the invention, FIG. 3 shows a side view of a profile according to the invention, FIG. 4 shows a perspective illustration of two profile ends for end-side connection, FIG. 5 shows a perspective illustration corresponding to FIG. 4, but from a different viewing angle, and FIG. 6 shows an enlarged detail from FIG. 5.

DETAILED DESCRIPTION OF THE INVENTION INCLUDING BEST MODE

Figure 1:
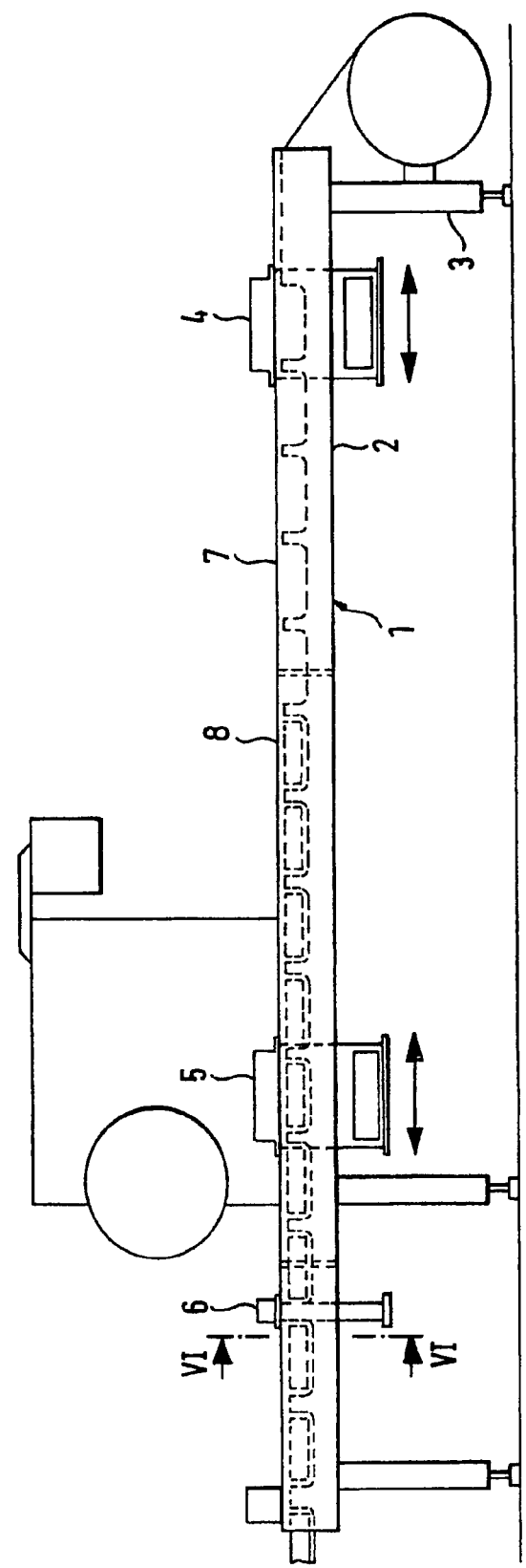
FIG. 1 shows a schematic side view of a packaging machine according to the invention.

The packaging machine according to FIG. 1 comprises a frame 1, which has side walls 2 and feet 3. The frame 1 bears a first workstation 4, designed as a forming station, a second workstation 5, designed as a sealing station, and a third workstation 6, designed a cutting station. The side wall 2 here is formed by profiles 7, 8 according to the invention which are connected at the end sides in a manner which will be described hereinbelow.

Each profile 7, 8 is shaped in a manner corresponding to the profile 7 according to FIG. 2. The profile 7 is C-shaped with two horizontal legs 9, 10 which are connected to one another via a vertical leg 11. The two horizontal legs 9, 10 are stiffened by stiffening lugs 12 at spaced-apart locations (see FIG. 3).

Integrally formed beneath the bottom horizontal leg 10 is a longitudinal web 13, which stiffens the profile 7 against loading in the vertical direction V.

The stiffening lugs 12 are detached from the longitudinal web 13, for example punched out of the same and bent upwards to the top horizontal leg. This results in corresponding cutouts 14 in the longitudinal web 13, although these do not significantly impair the stiffening action of the longitudinal web.

This method of producing the stiffening lugs 12 means that there is no need for any additional material or any separate parts. Such a profile can be produced from a stainless-steel strip by punching, bending and welding. The bending can be carried out here by rolling in a so-called profiling installation.

As can be seen with reference to FIG. 2, the top horizontal leg 9 is extended in the direction of the outside of the profile 7 and is provided with a downwardly oriented run-off slope 15. It is also the case that the longitudinal web 13 is provided, at its bottom end, with a corresponding run-off slope 16, which is likewise extended in the direction of the outside and is thus directed away from the transporting arrangement of the packaging machine and/or the products which are transported and processed there.

The profile 7 has the horizontal leg 10 directed towards the inside, i.e. the transporting arrangement of the packaging machine and/or the products which are transported and processed there, in which case a smooth and easy-to-clean inner surface is formed there.

The outside is of essentially open configuration, as can be seen with reference to FIG. 3. The profile 7 is closed merely in the region of the stiffening lugs 12 and is thus readily accessible from the outside for cleaning purposes and visual inspection. Any cleaning liquid here runs off to the outside by way of the run-off slopes 15, 16.

In FIGS. 4 and 5, furthermore, screw-connection plates 17, 18 are fitted to the end sides of the frame profiles 7, 8. The screw-connection plates 17, 18 are provided with bores 19, 20, in which case they can be screw-connected at the end sides via screws 21 and screw-connection sleeves 22. As an alternative, it is also possible, if required, for threads to be cut into the screw-connection plates 17, 18. Smooth bores, however, give rise to fewer hygiene problems.

An insert part 23 is also provided for insertion between the profiles 7, 8, in order to ensure a sufficiently sized gap between the end sides 7, 8 for the connecting location also to be readily accessible for cleaning purposes.

The enlarged detail according to FIG. 6 shows the stiffening lug 12 separated and bent out of the longitudinal web 13 and also connected to the top horizontal leg 9. This enlargement shows the continuous weld seam 24. The through-welding of the weld seam 24 avoids openings or gaps which could adversely affect hygiene.

In addition to the exemplary embodiment illustrated, further embodiments of the invention include an open profile in a packaging machine frame according to the invention. The essential factor is that the profiles 7, 8 are essentially open on the outside of the frame and are thus readily accessible for cleaning purposes and visual inspection.

LIST OF DESIGNATIONS

1 Frame
2 Side wall
3 Foot
4 Workstation
5 Sealing station
6 Cutting station
7 Profile
8 Profile
9 Horizontal leg
10 Horizontal leg
11 Vertical leg
12 Stiffening lug
13 Longitudinal web
14 Cutout
15 Run-off slope
16 Run-off slope
17 Screw-connection plate
18 Screw-connection plate
19 Bore
20 Bore
21 Screw
22 Screw-connection sleeve
23 Insert part
24 Weld seam

What is claimed is:

1. A packaging machine comprising:
a frame with side walls and feet which bear the side walls, each side wall having an outwardly facing front side, an inwardly facing back side, a top end and a bottom end each side wall further having an open profile (7, 8) that is partially closed by stiffening lugs (12) disposed at various locations along a length of the frame, each stiffening lug being formed by a bent portion of the frame, wherein each side wall further includes a downwardly sloping run-off slope at the corresponding top end, and a downwardly sloping run-off slope at the corresponding bottom end; and
at least one workstation borne by the frame.

2. The packaging machine as claimed in claim 1 wherein each open profile (7, 8) is open on the corresponding front side which is disposed on an outer side of the frame (1).

3. The packaging machine as claimed in claim 1 wherein each stiffening lug has an upwardly extending height (H) and a transverse width (B), and for each stiffening lug, the height (H) is greater than the width (B).

4. The packaging machine as claimed in claim 1 or claim 3 wherein each side wall includes a longitudinal web (13) running in a longitudinal direction that extends along the length of the frame.

5. The packaging machine as claimed in claim 4 wherein for each side wall, the open profile (7, 8) is formed integrally with the longitudinal web (13).

6. The packaging machine as claimed in claim 1 wherein each side wall includes a longitudinal web (13) formed on an underside of the profile (7, 8).

7. The packaging machine as claimed in claim 6 wherein for each side wall the stiffening lugs are cut out of the longitudinal web (13).

8. The packaging machine as claimed in claim 6 wherein for each side wall, the open profile (7,8) includes a vertical profile leg having an upwardly extending height, and the longitudinal web (13) has an upwardly extending height that is greater than the height of the vertical profile leg (11) of the open profile (7, 8).

9. The packaging machine as claimed in claim 1 wherein each stiffening lug (12) includes first and second opposite ends, and for each side wall, each stiffening lug is bent at the first end and is fastened on the open profile (7, 8) again at the second end.

10. The packaging machine as claimed in claim 9 wherein for each side wall, each stiffening lug (12) is welded to the open profile (7, 8) at the second end.

11. The packaging machine as claimed in claim 1 wherein the frame further comprises multiple sections and a connecting element for connecting two sections of the frame such that the two sections are spaced apart from each other.

12. The packaging machine as claimed in claim 1 wherein each side wall further comprises an additional open profile and end-side connecting elements (17, 18) connecting ends of the open profile and the additional open profile.

13. The packaging machine as claimed in claim 1 wherein each side wall further comprises an additional open profile and at least one insert part (23) connecting element for connecting ends of the open profile and the additional open profile.

14. The packaging machine as claimed in claim 13 wherein each of the at least one insert part connecting elements in an open profile region is spaced apart from a nearest stiffening lug.

15. A packaging machine comprising:
    a frame including a side profile section having a top end, a bottom end and a C-shaped cross-section that defines an outwardly facing opening along a lateral side of the frame, the frame further including a longitudinal web connected to the bottom end of the profile section, and multiple spaced-apart stiffening lugs that are cut out from the longitudinal web and bent to close out portions of the profile section; and
    at least one work station supported by the frame.

16. The packaging machine of claim 15 wherein the top end of the profile section defines a downwardly pointing run off slope.

17. The packaging machine of claim 16 wherein the longitudinal web has a bottom end that defines a downwardly pointing run off slope.

18. The packaging machine of claim 15 wherein the profile section includes top and bottom horizontal legs, and a vertical leg extending between the horizontal legs, wherein the horizontal legs and the vertical leg define the C-shaped cross-section.

19. The packaging machine of claim 18 wherein each stiffening lug is connected to the top horizontal leg.

20. A packaging machine comprising:
    a frame including a side wall having top and bottom horizontal legs and a vertical leg extending between the horizontal legs, the horizontal legs and the vertical leg defining a C-shaped profile, the frame further including a longitudinal web connected to the bottom horizontal leg, and multiple spaced-apart stiffening lugs, each stiffening lug having a first end that is integral with the longitudinal web and a second end that is secured to the top leg such that each lug closes a portion of the C-shaped profile; and
    at least one work station supported by the frame.

\* \* \* \* \*

UNITED STATES PATENT AND TRADEMARK OFFICE
CERTIFICATE OF CORRECTION

| | | |
|---|---|---|
| PATENT NO. | : 7,726,097 B2 | Page 1 of 1 |
| APPLICATION NO. | : 11/882940 | |
| DATED | : June 1, 2010 | |
| INVENTOR(S) | : Elmar Ehrmann | |

It is certified that error appears in the above-identified patent and that said Letters Patent is hereby corrected as shown below:

Column 6, Line 32, Claim 1:

After "bottom end" insert -- , --.

Column 7, Line 15, Claim 12:

After "connecting elements (17, 18)" insert -- for --.

Signed and Sealed this

Seventeenth Day of August, 2010

David J. Kappos
*Director of the United States Patent and Trademark Office*